G. H. LEWIS.
Car Spring.
No. 43,316.
Patented June 28, 1864.
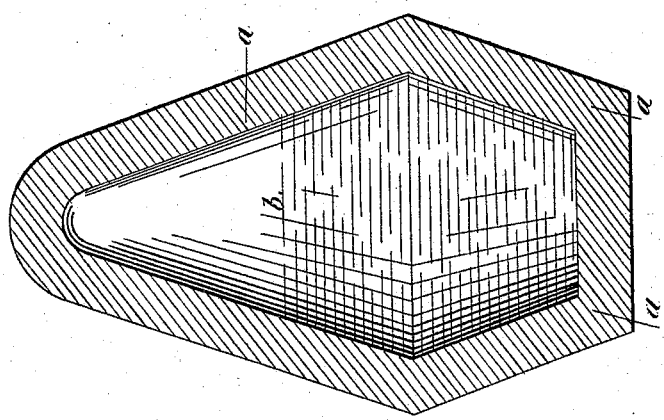
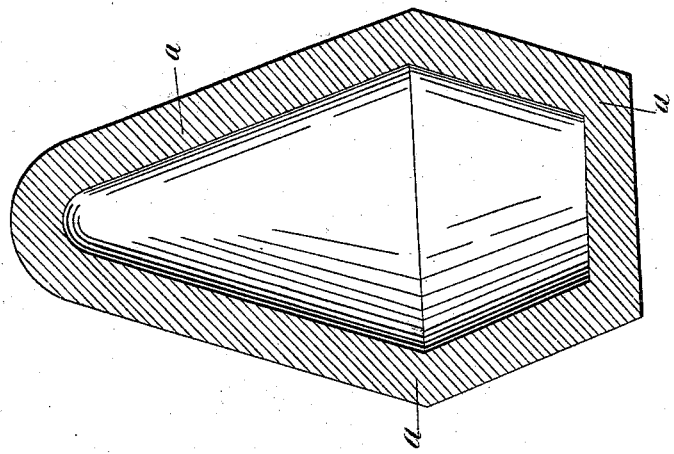
Witnesses:
Frederic A. Layer
Geo. W. Mann
Inventor:
Geo. H. Lewis
by his att'y
Joseph Gavett

UNITED STATES PATENT OFFICE.

GEORGE H. LEWIS, OF PROVIDENCE, RHODE ISLAND.

IMPROVEMENT IN CAR-SPRINGS.

Specification forming part of Letters Patent No. 43,316, dated June 28, 1864.

*To all whom it may concern:*

Be it known that I, GEORGE H. LEWIS, of Providence, in the county of Providence and State of Rhode Island, have invented certain new and useful Improvements in Springs for Railway-Cars, &c.; and I do hereby declare that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

For sustaining the bodies of railway and other carriages it is well known that of late rubber springs have been extensively used and generally preferred over all others. They have been made in a solid form of vulcanized india-rubber and its various compounds, and for a while operate successfully; but experience has proved that when used for a long time and subjected to heavy pressure they lose their elasticity and become dense, the fibers or particles of the rubber becoming matted together, making the spring inactive and depriving it of its liveliness, which it never can recover. The large quantity of rubber necessarily employed in their construction, being made solid, as before stated, renders their manufacture very expensive.

To cheapen the manufacture of these kinds of springs, and also to construct them as to render them much more elastic than those heretofore constructed and in such a manner as to prevent their ever losing liveliness or their particles becoming matted together, are the objects of the present invention.

My new india-rubber spring consists of a hollow air-tight elastic vessel or shell, the sides or walls of which are of sufficient thickness to be practically non-collapsible. This vessel or shell may also be particularly or wholly filled with water or any other suitable liquid.

I will now proceed to describe one mode by which my spring may be made, reference being had to the accompanying drawings, Figure 1 being a vertical section of the same, and Fig. 2 a similar view showing the spring partially filled with liquid.

I take, for instance, one hundred pounds of rubber, one hundred and twenty pounds of zinc, and six pounds of sulphur, and compound them in the manner well known to rubber manufacturers, pass the whole between callender-rolls, and unite the edges so as to form a hollow air-tight vessel, which is placed in a mold and heated. The expansion of the air within the vessel brings the hollow rubber to the shape of the mold. Water or other liquid may be introduced into the hollow vessel, as shown in Fig. 2 at *a a*. The sides or walls *b b* of the spring should be of sufficient thickness to be practically non-collapsible. The proportions of the compound can of course be very much varied as well as its ingredients, and the form of the spring can, by the use of appropriate molds, be altered at pleasure.

By the above description it will be seen that the elasticity of the rubber is much aided by that of the air within the hollow vessel, so that when the former is compressed the latter forms an air-cushion for it to act upon, and when the pressure is removed assists in returning the spring to its original position, the whole forming a spring which cannot become "dead," but which will always retain its elasticity. It will be seen, also, that by making the spring hollow the weight of rubber necessary to be employed, and consequently its cost, is very much diminished. A still greater resisting-power is added to the spring by introducing a suitable liquid into it, as shown in Fig. 2, because in this case the elasticity of the spring is increased both by the air-cushion and the resistance of the liquid, and as these latter elements cannot escape and always remain the same within the hollow vessel, the deterioration of the working-power of the spring is almost impossible.

The spring may be wholly or partially inclosed in a suitable box or casing and acted upon by a plunger, or may be applied in any proper manner, according to the purpose for which it is to be used.

Having thus described my improvements,

I shall state my claims as follows: What I claim as my invention, and desire to have secured to me by Letters Patent, is—

The improvement in the manufacture of car and other springs, which consists in forming a hollow air-tight elastic vessel or shell, the sides or walls of which are of sufficient thickness to to be practically non-collapsible, in combination with partially or wholly filling said vessel with any suitable liquid, so as to add to the resisting-power of the spring, as set forth.

GEORGE H. LEWIS.

Witnesses:
JOSEPH GAVETT,
ALBERT W. BROWN.